(12) United States Patent
Kawamura

(10) Patent No.: US 8,842,936 B2
(45) Date of Patent: Sep. 23, 2014

(54) METHOD, APPARATUS, AND PROGRAM FOR ALIGNING IMAGES

(75) Inventor: Takahiro Kawamura, Ashigarakami-gun (JP)

(73) Assignee: FUJIFILM Corporation, Tokyo (JP)

(*) Notice: Subject to any disclaimer, the term of this patent is extended or adjusted under 35 U.S.C. 154(b) by 221 days.

(21) Appl. No.: 13/158,080

(22) Filed: Jun. 10, 2011

(65) Prior Publication Data

US 2011/0305405 A1 Dec. 15, 2011

(30) Foreign Application Priority Data

Jun. 11, 2010 (JP) ................. 2010-133538

(51) Int. Cl.
G06K 9/32 (2006.01)
G06K 9/00 (2006.01)
G06T 7/00 (2006.01)
G06T 3/00 (2006.01)

(52) U.S. Cl.
CPC ....... G06T 7/003 (2013.01); G06T 2207/20064 (2013.01); G06T 7/0036 (2013.01); G06T 3/0068 (2013.01); G06T 2207/20016 (2013.01); G06T 2207/30061 (2013.01); G06T 2207/10116 (2013.01); G06T 2207/20021 (2013.01)
USPC .......................................... 382/294; 382/128

(58) Field of Classification Search
None
See application file for complete search history.

(56) References Cited

U.S. PATENT DOCUMENTS

| | | | |
|---|---|---|---|
| 5,359,513 A * | 10/1994 | Kano et al. | 382/128 |
| 6,661,873 B2 * | 12/2003 | Jabri et al. | 378/98.11 |
| 7,068,826 B2 * | 6/2006 | Jabri et al. | 382/128 |
| 7,346,198 B2 | 3/2008 | Oosawa | |
| 7,397,934 B2 | 7/2008 | Bloch et al. | |
| 7,783,096 B2 * | 8/2010 | Chen et al. | 382/128 |
| 7,961,925 B2 * | 6/2011 | Chen et al. | 382/128 |
| 2001/0010732 A1 * | 8/2001 | Oosawa | 382/128 |
| 2001/0021264 A1 * | 9/2001 | Armato et al. | 382/132 |
| 2005/0027187 A1 * | 2/2005 | Barth et al. | 600/407 |
| 2005/0100208 A1 * | 5/2005 | Suzuki et al. | 382/157 |
| 2006/0029291 A1 * | 2/2006 | Sun et al. | 382/294 |
| 2007/0133736 A1 * | 6/2007 | Chen et al. | 378/5 |
| 2007/0196007 A1 * | 8/2007 | Chen et al. | 382/131 |
| 2007/0206880 A1 * | 9/2007 | Chen et al. | 382/294 |

(Continued)

FOREIGN PATENT DOCUMENTS

| | | |
|---|---|---|
| DE | 102006046742 A1 | 4/2008 |
| JP | 63-278183 A | 11/1988 |
| JP | 2000-342558 A | 12/2000 |
| JP | 2009-195471 A | 9/2009 |

OTHER PUBLICATIONS

Sprawls, P, The Physical Principles of Medical Imaging, Aug. 22, 2008, online textbook version: http://www.sprawls.org/ppmi2/, p. 6.*

(Continued)

Primary Examiner — Stephen R Koziol
Assistant Examiner — Jonathan S Lee
(74) Attorney, Agent, or Firm — Sughrue Mion, PLLC

(57) ABSTRACT

A band image generating means generates a plurality of first band images and a plurality of second band images that represent structures of different frequency bands within a first and a second image of the same portion of a single subject. A positional shift amount obtaining means obtains amounts of positional shift among corresponding positions within the first band images and the second band images of corresponding frequency bands.

9 Claims, 11 Drawing Sheets

(56) References Cited

U.S. PATENT DOCUMENTS

2008/0112649 A1 5/2008 Chen et al.
2008/0247626 A1 10/2008 Dhannantwari et al.
2011/0262016 A1* 10/2011 Shekhar et al. ............... 382/131

OTHER PUBLICATIONS

Fujiyoshi, Hironobu, "Gradient Based Feature Extraction—SIFT and HOG", Reports of the Academy of Data Processing, 2007, pp. 211-224, CVIM 160.

Watanabe, Koji, "Positional Alignment and Overlapping of Images Obtained by Multiple Modalities", Journal of the Japanese Society of Radiological Technology, 2003, pp. 60-65, vol. 59, No. 1.

Extended European search report issued Jun. 18, 2013 in corresponding German patent application No. 11169593.8-1906.

Lester et al. "A survey of hierarchical non-linear medical image registration", Pattern Recognition, Elsevier, GB, vol. 32, No. 1, Jan. 1, 1000, pp. 129-149, XP004151619, ISSN: 0031-3203, DOI: 10.1016/S0031-3203(98) 00095-8.

Office Action issued by the Japanese Patent and Trademark Office in Japanese Patent Application No. 2010-133538 dated Dec. 3, 2013.

* cited by examiner

METHOD, APPARATUS, AND PROGRAM FOR ALIGNING IMAGES

BACKGROUND OF THE INVENTION

1. Field of the Invention

The present invention is related to an image position aligning method, an image position aligning apparatus, and an image position aligning program for aligning a plurality of images with respect to each other.

2. Description of the Related Art

The energy subtraction process that utilizes the fact that amounts of attenuation of radiation that passes through subjects differ depending on the substance through which the radiation passes is conventionally known. The energy subtraction process employs two radiation images obtained by irradiating two types of radiation having different energies onto a subject. The energy subtraction process may be utilized to generate a soft tissue image, which is an image obtained of the thoracic region from which bones are removed, for example. Such a soft tissue image enables observation of patterns that appear within soft tissue, without the observation being impeded by the bones. Conversely, a bone image, from which soft tissue has been removed, may be generated, to enable observation of patterns that appear within bones, without the observation being impeded by the soft tissue.

In the case that the two radiation images obtained by the two types of radiation having different energies to be employed in the energy subtraction process are obtained by two imaging operations, high energy radiation and low energy radiation are irradiated onto a subject with an interval of several hundred milliseconds therebetween. If the subject moves between the two imaging operations, positional shifts occur, and artifacts will appear within an image (referred to as a subtracted image) generated by the subtraction process. In addition, these artifacts also appear in cases that the temporal subtraction process that obtains subtracted images that represent differences between two radiation images in temporal series obtained at different times is performed.

Various techniques for reducing such artifacts have been proposed. For example, U.S. Patent Application Publication No. 20080247626 discloses a technique for estimating local movements between two radiation images, in which ROI's (Regions Of Interest) are set within the two radiation images, and the ROI's are employed to perform positional alignment by performing matching. In this technique, the sizes of the ROI's within the images are reduced in a stepwise manner, to perform positional alignment of smaller structures in a gradual manner. Specifically, ROI's of a certain size are set at corresponding control points within two images to calculate an amount of positional shift. One of the two images is deformed to perform positional alignment based on the calculated amount of positional shift. The aligned images are employed to perform positional alignment employing ROI's of a smaller size. The above processes are repeatedly performed until a predetermined smallest size of the ROI's is reached. Thereby, positional alignment is performed among tissue included in the images in a gradual manner from structures in low frequency bands to structures in high frequency bands.

A plurality of structures, such as the heart, pulmonary blood vessels, ribs, and the diaphragm, respectively exhibit different three dimensional movements in the thoracic region of a human body. The plurality of structures overlap each other in the direction that a subject image is projected onto a radiation detector that detects radiation and outputs image signals. Here, for example, the heart includes a large amount of comparatively low frequency components, and the pulmonary blood vessels include a large amount of comparatively high frequency components. In the case that the technique disclosed in U.S. Patent Application Publication No. 20080247626 is employed, positional alignment is performed from structures in low frequency bands to structures in high frequency bands. Therefore, positional alignment is performed in a stepwise manner from the heart to the pulmonary blood vessels. However, in the technique disclosed in U.S. Patent Application Publication No. 20080247626, structures in low frequency bands are deformed along with the structures in high frequency bands when positional alignment of the structures in high frequency bands is performed. Therefore, in the case that two images include structures that exhibit different three dimensional movements such as the heart and pulmonary blood vessels, positional shifts occur in the heart, which has already been positionally aligned, when positional alignment of the pulmonary blood vessels is performed. If positional shifts occur in the heart in this manner, artifacts will be present in a subtracted image obtained by the energy subtraction process.

SUMMARY OF THE INVENTION

The present invention has been developed in view of the foregoing circumstances. The objective of the present invention is to perform more accurate positional alignment among a plurality of images.

A first image position aligning apparatus of the present invention is characterized by comprising:

band image generating means, for generating a plurality of first band images and a plurality of second band images that represent structures of different frequency bands within a first and a second image of the same portion of a single subject; and positional shift amount obtaining means, for obtaining amounts of positional shift among corresponding positions within the first band images and the second band images of corresponding frequency bands.

Any desired pieces of information that represent the differences among corresponding positions within the first band images and the second band images may be employed as the "amounts of positional shift". Specific examples of such pieces of information include distances among corresponding points within the first and second band images and directional vectors among the corresponding points. Note that the amounts of positional shift may be calculated employing the first and second band images, or may be calculated employing the first and second images.

Note that the first image position aligning apparatus of the present invention may further comprise:

aligning means, for deforming at least one of the first band images and the second band images based on the amounts of positional shift.

In this case, the first image position aligning apparatus may further comprise:

reconstructing means, for sequentially reconstructing at least one of the deformed first band images and second band images from low frequency bands, and for obtaining at least one of the first image and the second image in a deformed state.

In addition, in this case, the first image position aligning apparatus may further comprise:

display means, for displaying at least one of the deformed first band images and the deformed second band images during the intermediate stages of the reconstruction process in a stepwise manner from the low frequency bands to high frequency bands.

Further, the image position aligning apparatus of the present invention may further comprise:

subtracting means, for obtaining at least one of a plurality of first subtracted band images that mainly include first structures of the subject, and a plurality of second subtracted band images that mainly include second structures of the subject, by performing energy subtraction processes employing at least one of the deformed first band images and the deformed second band images.

In this case, the image position aligning apparatus may further comprise:

reconstructing means, for sequentially reconstructing at least one of the first subtracted band images and second subtracted band images from low frequency bands, and for obtaining at least one of first subtracted images that mainly include the first structures of the subject and second subtracted images that mainly include the second structures of the subject.

In addition, in this case, the image position aligning apparatus may further comprise:

display means, for displaying at least one of the deformed first subtracted band images and the deformed second subtracted band images during the intermediate stages of the reconstruction process in a stepwise manner from the low frequency bands to high frequency bands.

A second image position aligning apparatus of the present invention is characterized by comprising:

feature image generating means, for generating a plurality of first feature images and a plurality of second feature images that represent structures having different anatomical features included in both a first and a second image of the same portion of a single subject; and positional shift amount obtaining means, for obtaining amounts of positional shift among corresponding positions within the first feature images and the second feature images.

Note that the second image position aligning apparatus of the present invention may further comprise:

aligning means, for deforming at least one of the first band images and the second band images based on the amounts of positional shift.

In this case, the second image position aligning apparatus may further comprise:

reconstructing means, for sequentially reconstructing at least one of the deformed first feature images and second feature images from low frequency bands, and for obtaining at least one of the first image and the second image in a deformed state.

The first and second image position aligning apparatuses of the present invention may further comprise:

initial aligning means, for performing initial positional alignment of the first image and the second image; and wherein:

the band image generating means or the feature image generating means generates the plurality of first band images and the plurality of second band images or the plurality of first feature images and the plurality of second feature images from the initially aligned first and second images.

A first image position aligning method of the present invention is characterized by comprising the steps of:

generating a plurality of first band images and a plurality of second band images that represent structures of different frequency bands within a first and a second image of the same portion of a single subject; and obtaining amounts of positional shift among corresponding positions within the first band images and the second band images of corresponding frequency bands.

A second image position aligning method of the present invention is characterized by comprising the steps of:

generating a plurality of first feature images and a plurality of second feature images that represent structures having different anatomical features included in both a first and a second image of the same portion of a single subject; and obtaining amounts of positional shift among corresponding positions within the first feature images and the second feature images.

Note that the first and second image position aligning methods of the present invention may be provided as programs that cause a computer to execute the methods.

The first image position aligning apparatus and the first image position aligning method of the present invention generate a plurality of first band images and a plurality of second band images that represent structures of different frequency bands within a first and a second image of the same portion of a single subject; and obtain amounts of positional shift among corresponding positions within the first band images and the second band images of corresponding frequency bands. Therefore, in the case that a plurality of structures of different frequency bands are included in the first and second images and the plurality of structures respectively exhibit different three dimensional movements, the amount of positional shift for each frequency band is the amount of positional shift for the structures in each frequency band. Accordingly, positional alignment is performed for the band images of each frequency band using the amounts of positional shift, thereby positionally aligning the structures of each frequency band. As a result, positional alignment of the structures of each frequency band can be performed with high accuracy, even in the case that the frequency bands of a plurality of structures included in the first and second radiation images are different.

In addition, the first image position aligning apparatus may further comprise: reconstructing means, for sequentially reconstructing at least one of the deformed first band images and second band images from low frequency bands, and for obtaining at least one of the first image and the second image in a deformed state. In this case, at least one of the first image and the second image, in which structures of corresponding frequency bands are accurately positionally aligned, can be obtained, even in the case that the frequency bands of a plurality of structures included in the first and second radiation images are different and the plurality of structures respectively exhibit different three dimensional movements.

Here, in the case that the reconstructed first and second images are displayed, the amount of calculations is great. Therefore, a long time is required between the initiation of the reconstruction process until the first and second images are displayed. For this reason, at least one of the deformed first band images and the deformed second band images may be displayed during the intermediate stages of the reconstruction process in a stepwise manner from the low frequency bands to high frequency bands. Thereby, the positionally aligned first and second band images can be displayed, although at low resolution, until the reconstructed first and second images are displayed. Accordingly, the wait time until images are displayed can be shortened.

In addition, at least one of a plurality of first subtracted band images that mainly include first structures of the subject, and a plurality of second subtracted band images that mainly include second structures of the subject may be obtained, by performing energy subtraction processes employing at least one of the deformed first band images and the deformed second band images. Thereby, at least one of the first and second band images, in which artifacts are reduced, can be obtained. This is because the structures in corresponding frequency bands are accurately positionally aligned, even in the case that the frequency bands of a plurality of structures included in the first and second radiation images are different and the plurality of structures respectively exhibit different three dimensional movements.

Further, at least one of the first subtracted band images and second subtracted band images may be sequentially reconstructed from low frequency bands, and at least one of first subtracted images that mainly include the first structures of the subject and second subtracted images that mainly include the second structures of the subject may be obtained. Thereby, at least one of the first subtracted band images and the second subtracted band images, in which artifacts are reduced, can be obtained. This is because the structures in corresponding frequency bands are accurately positionally aligned, even in the case that the frequency bands of a plurality of structures included in the first and second radiation images are different and the plurality of structures respectively exhibit different three dimensional movements.

Here, in the case that the reconstructed first and second subtracted images are displayed, the amount of calculations is great. Therefore, a long time is required between the initiation of the reconstruction process until the first and second subtracted images are displayed. For this reason, at least one of the deformed first subtracted band images and the deformed second subtracted band images may be displayed during the intermediate stages of the reconstruction process in a stepwise manner from the low frequency bands to high frequency bands. Thereby, the positionally aligned first and second subtracted band images can be displayed, although at low resolution, until the reconstructed first and second subtracted images are displayed. Accordingly, the wait time until images are displayed can be shortened.

The second image position aligning apparatus and the second image position aligning method of the present invention generate a plurality of first feature images and a plurality of second feature images that represent structures having different anatomical features included in both a first and a second image of the same portion of a single subject; and obtain amounts of positional shift among corresponding positions within the first feature images and the second feature images.

Therefore, corresponding structures can be accurately positionally aligned, even if structures having different anatomical features included in the first and second images respectively exhibit different three dimensional movements. As a result, positional alignment performed by deforming at least one of the first feature images and the second feature images of corresponding structures can be performed accurately, based on the obtained amounts of positional shift.

In addition, reconstructing at least one of the deformed first feature images and second feature images may be reconstructed from low frequency bands, to obtain at least one of the first image and the second image in a deformed state. Thereby, at least one of the first image and the second image, in which corresponding structures are accurately positionally aligned, can be obtained.

DESCRIPTION OF THE PREFERRED EMBODIMENTS

Figure 1:
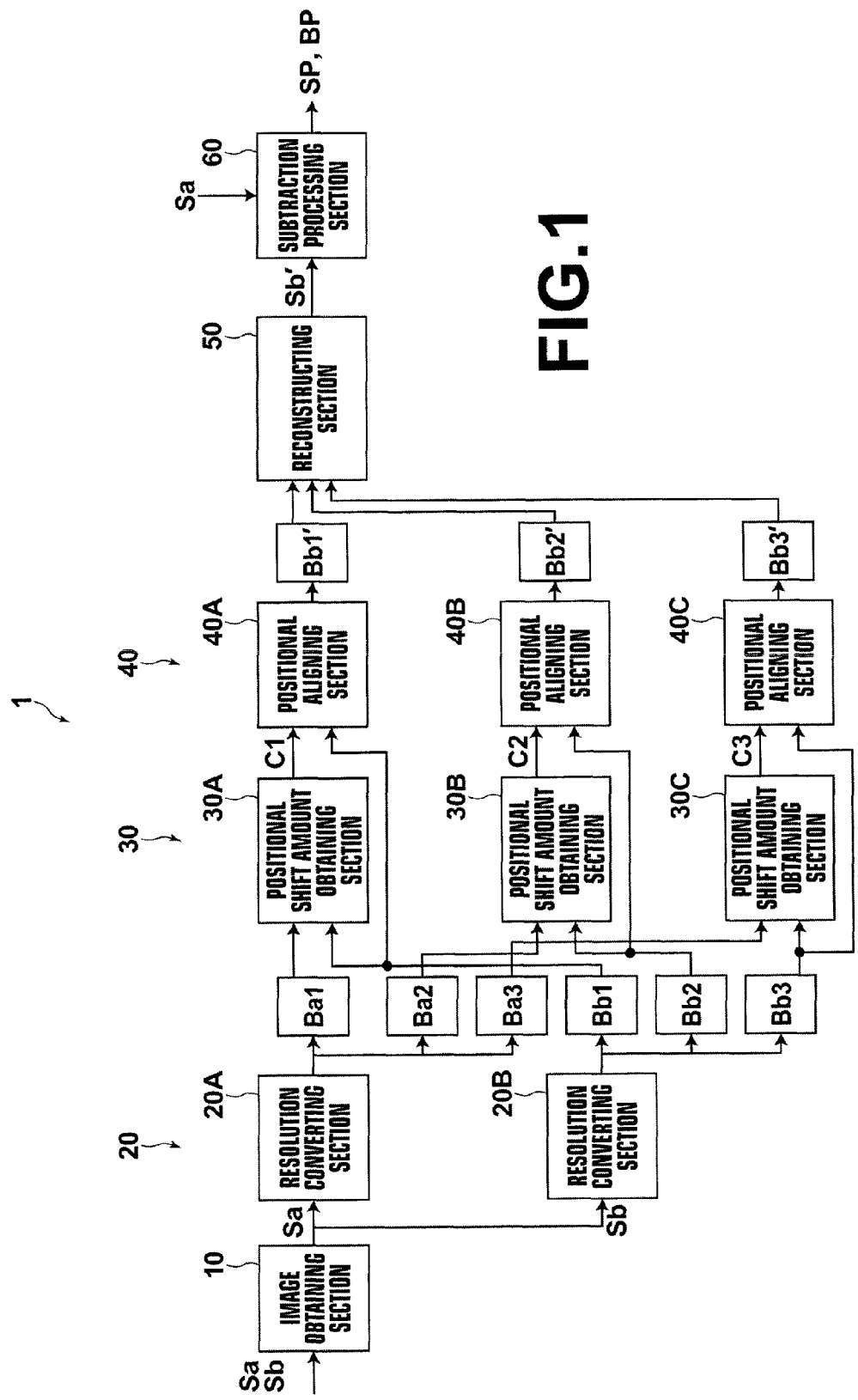
FIG. 1 is a block diagram that illustrates the schematic structure of an image position aligning apparatus according to a first embodiment of the present invention.

Hereinafter, embodiments of the present invention will be described with reference to the attached drawings. FIG. 1 is a block diagram that illustrates the schematic structure of an image position aligning apparatus 1 according to a first embodiment of the present invention. Note that the image position aligning apparatus 1 of FIG. 1 is applied to an energy subtraction apparatus that performs subtraction processes using pairs of radiation images. The energy subtraction apparatus is mounted on an imaging console that obtains radiation images using a radiation detector, for example. The configuration of the image position aligning apparatus 1 illustrated in FIG. 1 is realized by executing an image alignment processing program loaded into an auxiliary memory device on a computer (a personal computer, for example). At this time, the image alignment processing program is installed in the computer after being distributed recorded on data recording media such as CD-ROM's, or via networks such as the Internet.

The image position aligning apparatus 1 according to the first embodiment is equipped with: an image obtaining section 10; a resolution converting section 20; a positional shift amount obtaining section 30; a positional aligning section 40; a reconstructing section 50; and a subtraction processing section 60.

The image obtaining section 10 obtains first and second radiation images Sa and Sb, which are to be positionally aligned with respect to each other. Examples of the first and second radiation images Sa and Sb include a high energy image and a low energy image obtained by two imaging operations employing radiation having different energies. Here, the high energy image is that obtained by an imaging operation during which a tube voltage within a range from 100 kVp to 140 kVp is applied to a radiation source, and the low energy image is that obtained during an imaging operation during which a tube voltage within a range from 50 kVp to 80 kVp is applied to the radiation source during frontal thoracic imaging operations, for example. Note that the high energy image may be employed for image diagnosis as is. As an alternative, the first and second radiation images Sa and Sb may be two radiation images in temporal series of the same portion of a single subject obtained at different times, to be employed in a temporal subtraction process.

The resolution converting section 20 converts the resolutions of the first and second radiation images Sa and Sb into a plurality of band images of different frequency bands. Note that in FIG. 1, the resolution converting section 20 is equipped with a first resolution converting section 20A for converting the resolution of the first radiation image Sa and a second resolution converting section 20B for converting the resolution of the second radiation image Sb. Alternatively, a single resolution converting section 20 may convert the resolutions of both the first and second radiation images Sa and Sb. In the following description, the term "resolution converting section 20" refers collectively to the first and second resolution converting sections 20A and 20B.

Figure 2:
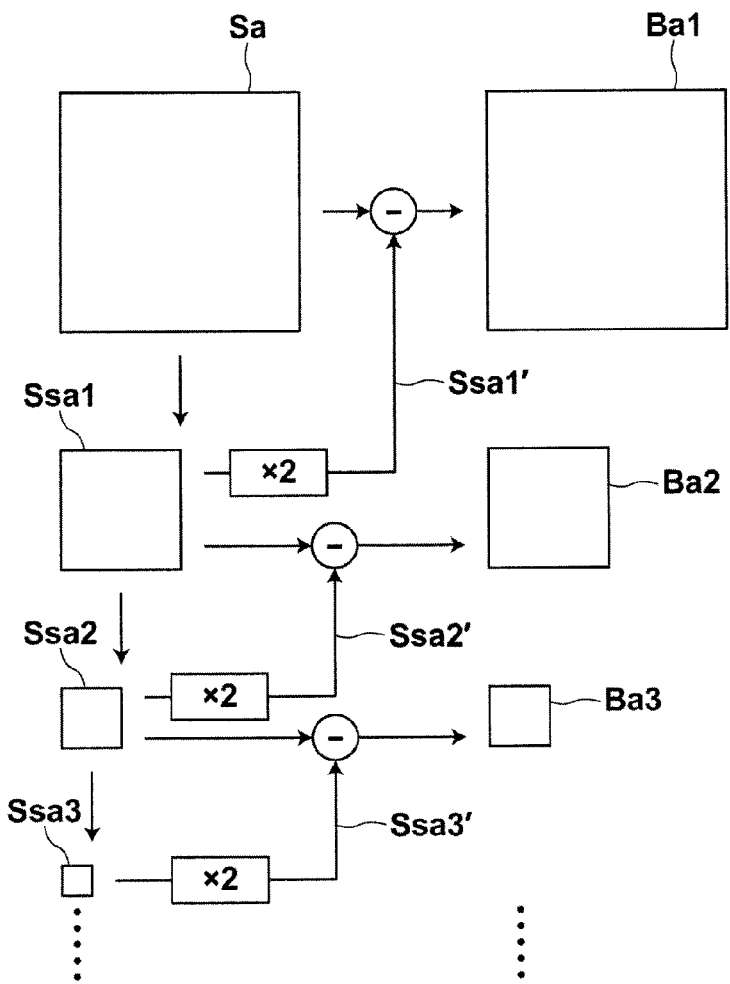
FIG. 2 is a diagram for explaining resolution conversion.

FIG. 2 is a diagram for explaining resolution conversion. Note that here, a description will be given only with respect to resolution conversion of the first radiation image Sa. However, the same resolution conversion process is performed with respect to the second radiation image Sb. First, the resolution converting section 20 performs a filtering process with respect to the radiation image Sa using a Gaussian filter in which σ=1, to reduce the radiation image Sa to ½ its size, and to generate a reduced image Ssa1. Next, the resolution converting section 20 generates an enlarged image Ssa1' of the same size as the radiation image Sa from the reduced image Ssa1, by employing interpolating calculations such as tertiary spline interpolation. Then, the enlarged image Ssa1' is subtracted from the radiation image Sa, to generate a first band image Ba1. Next, the resolution converting section 20 performs a filtering process with respect to the reduced image Ssa1 using a Gaussian filter in which σ=1, to reduce the reduced image Ssa1 to ½ its size, and to generate a reduced image Ssa2. Then, the resolution converting section 20 generates an enlarged image Ssa2' of the same size as the enlarged image Ssa1' from the reduced image Ssa2, to generate an enlarged image Ssa2'. Then, the enlarged image Ssa2' is subtracted from the enlarged image Ssa1', to generate a second band image Ba2. Further, the above processes are repeated until a band image of a desired frequency band is generated, to generate a plurality of band images Baj (j=1 through n) of a plurality of frequency bands. Note that the plurality of band images Baj may be generated by other resolution converting techniques, such as wavelet conversion. As a further alternative, the plurality of band images of different frequency bands may be generated by filtering processes that reduce the high frequency components of images, without changing the sizes of the radiation images.

In the present embodiment, three band images Ba1 through Ba3 and Bb1 through Bb3 are generated with respect to the first and second radiation images Sa and Sb. However, a greater number of band images of different frequency bands may be generated.

Figure 3:
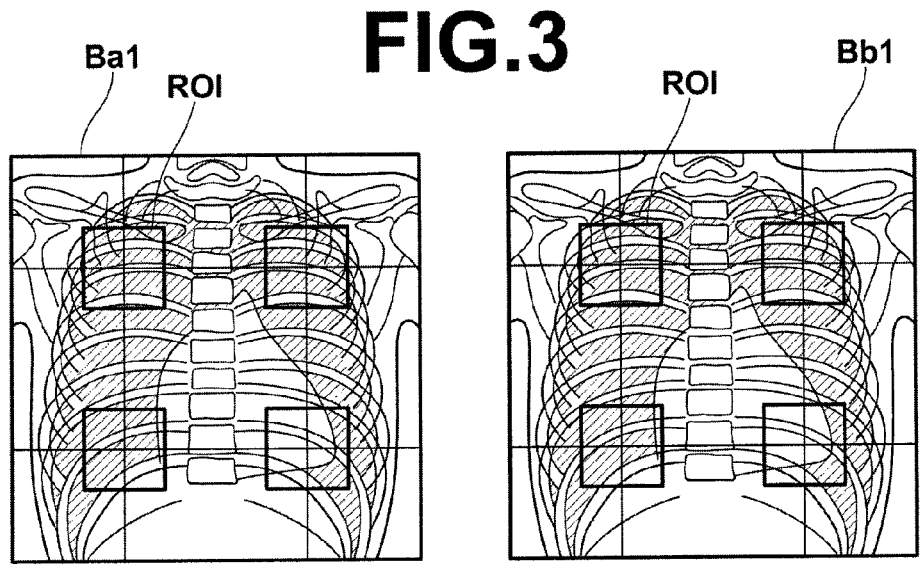
FIG. 3 is a diagram for explaining setting of ROI's (Regions Of Interest).

The positional shift amount obtaining section 30 obtains the amounts of positional shifting for corresponding pixel positions of the first band images Ba1 through Ba3 and the second band images Bb1 through Bb3 having corresponding frequency bands. For example, template matching is performed among the first band images Ba1 through Ba3 and the second band images Bb1 through Bb3 having corresponding frequency bands, and amounts of positional shift C1 through C3 among corresponding pixel positions are calculated for the first and second band images. Here, the calculation of amounts of positional shift that employ the first band image Ba1 and the second band image Ba2 will be described. As illustrated in FIG. 3, an ROI (Region Of Interest) is set at corresponding lattice points within the first band image Ba1 and the second band image Bb1. One of the ROI's (for example, the ROI within the first band image Ba1) is shifted within a predetermined range that employs the corresponding ROI within the second band image Bb1 as a reference, to calculate the degree of similarity between the two ROI's. Then, the point within the second band image Bb1 corresponding to the lattice point within the first band image Ba1 when the degree of similarity is maximal is derived. Thereafter, the distance between the lattice point within the second band image Bb1 and the point corresponding thereto is calculated as an amount of positional shift C1. Note that the amounts of positional shift with respect to pixel positions among lattice points are calculated by interpolation calculations that employ the amounts of positional shifts of the lattice positions. As an alternative, vectors that connect the lattice points to the corresponding points may be employed as the amounts of positional shift.

Note that normalized cross correlated values are employed to represent the degrees of similarity. In addition, the number of ROI's is set to 4 in the example illustrated in FIG. 3, but the present invention is not limited to such a configuration. Further, the ROI's may be set not only on the lattice points as illustrated in FIG. 3, but also on characteristic points within the images, such as the intersections among edges included in the first band images Sa1 through Ba3 and the second band images Bb1 through Bb3.

Here, the normalized cross correlated values are calculated employing the technique disclosed in Japanese Unexamined Patent Publication No. 2000-342558, for example. In the case that the pixel value of an $i^{th}$ pixel within the ROI of a first band image is designated as Sa(i) and the pixel value of an $i^{th}$ pixel within the ROI of a second band image is designated as Sb(i), the normalized cross correlated value can be calculated according to formula (1) below. Note that I represents the total number of pixels within the ROI's, $m_A$ and $m_B$ respectively represent the mean pixel values within the ROI's of the first and second band images, respectively, and $\sigma_A$ and $\sigma_B$ respectively are standard deviations of the pixel values within the ROI's of the first and second band images.

$$C = \frac{1}{i}\sum_{i=1}^{I} \frac{\{Sa(i) - m_A\}\{Sa(i) - m_B\}}{\sigma_A \cdot \sigma_B} \quad (1)$$

$$m_A = \frac{1}{I}\sum_{i=1}^{I} Sa(i)$$

$$m_B = \frac{1}{I}\sum_{i=1}^{I} Sb(i)$$

$$\sigma_A = \sqrt{\frac{1}{I}\sum_{i=1}^{I} \{Sa(i) - m_A\}^2}$$

$$\sigma_B = \sqrt{\frac{1}{I}\sum_{i=1}^{I} \{Sa(i) - m_B\}^2}$$

By employing the normalized cross correlated values in this manner, the degrees of similarity among the first and second band images can be calculated without being influenced by differences in mean densities or gradations, caused by differences in exposure conditions among the first and second images. Here, the correlations among the first and second band images are low at regions in which positional shifts are present between the first and second band images. Accordingly, the normalized cross correlated value assumes a value of 1 when the ROI's of the corresponding first and second band images completely match, and assume a value of 0 when they are completely independent of each other.

Note that in FIG. 1, the image position aligning apparatus 1 is equipped with a first positional shift amount obtaining section 30A for obtaining the amount of positional shift C1 between the band images Ba1 and Bb1, a second positional shift amount obtaining section 30B for obtaining the amount of positional shift C2 between the band images Ba2 and Bb2, and a third positional shift amount obtaining section 30C for obtaining the amount of positional shift C3 between the band images Ba3 and Bb3. As an alternative, a single positional shift amount obtaining section 30 may be configured to obtain amounts of positional shift C1 through C3 among the first band images Ba1 through Ba3 and the second band image Bb1 through Bb3. In the following description, the term "positional shift amount obtaining section 30" refers collectively to the first through third positional shift amount obtaining sections 30A through 30C.

The method by which the amounts of positional shift are obtained by the positional shift amount obtaining section 30 is not limited to that described above. As an alternative, the method disclosed by H. Fujiyoshi in "Gradient Based Feature Extraction—SIFT and HOG", Reports of the Academy of Data Processing CVIM 160, pp. 211-224, 2007 may be employed. This method detects feature points within images which are to be positionally aligned, employing SIFT (Scale Invariant Feature Transform) that describes features which do not change through rotation, scale changes, etc., or HOG (Histograms of Oriented Gradients), which are the directions of brightness gradients within local regions in histogram form. In this case, the positional shift amount obtaining section 30 detects a feature point within the first band image Ba1 using the method disclosed by Fujiyoshi, detects a point within the second band image Bb1 corresponding to the feature point, and calculates the amount of positional shift between the feature point and the corresponding point.

As a further alternative, the amounts of positional shift may be obtained employing the first and second radiation images Sa and Sb. In this case, amounts of positional shift between corresponding pixel positions within the first and second radiation images Sa and Sb may be employed as the amounts of positional shift among the first band images Ba1 through Ba3 and the second band images Bb1 through Bb3.

It is preferable for the amount of positional shift to be calculated for the band images having the lowest frequency bands first, and the for the amount of positional shift to be calculated for the band images having the next lowest frequency bands, when obtaining the amounts of positional shift. Calculating the amounts of positional shift in this manner enables the search range of the ROT's to be narrowed when performing template matching using the amount of positional shift calculated for a lower frequency band, when calculating the amount of positional shift of the band images having the next lowest frequency band. Therefore, the amounts of positional shift can be calculated more efficiently.

The positional aligning section 40 performs positional alignment of the first band images Ba1 through Ba3 and the second band images Bb1 through Bb3, employing a technique in which one of the pairs of images undergoes non linear distorted transform (warping), as disclosed in U.S. Pat. No. 7,346,198, for example. In the present embodiment, the amounts of shift of the lattice points within the second band images with respect to the lattice points within the first and images are calculated as the amounts of positional shift C1 through C3. Therefore, the first band images Ba1 through Ba3 and the second band images Bb1 through Bb3 are positionally aligned by deforming the second band images Bb1 through Bb3.

Note that the image position aligning apparatus 1 of FIG. 1 is equipped with: a first positional aligning section 40A for positionally aligning the band images Ba1 and Bb1; a second positional aligning section 40B for positionally aligning the band images Ba2 and Bb2; and a third positional aligning section 40C for positionally aligning the band images Ba3 and Bb3. Alternatively, a single positional aligning section 40 may align the positions of the first band images Ba1 through Ba3 and the second band images Bb1 through Bb3. In the following description, the term "image position aligning section 40" refers collectively to the first through third image position aligning sections 40A through 40C.

As alternatives to warping, affine transform accompanied by parallel movement, rotation, magnification and reduction, or one of parallel movement, rotation, magnification and reduction may be employed to positionally align the first and second band images. Particularly in the case that radiation images are those that do not include structures that exhibit large movements, such as the heart, positional alignment performed by affine transform or one of parallel movement, rotation, magnification and reduction can shorten the amount of time required for calculations compared to warping.

The reconstructing section 50 reconstructs second band images Bb1' through Bb3', which are deformed by the positional aligning section 40, to generate a deformed second radiation image Sb'. Specifically, a process opposite the resolution conversion illustrated in FIG. 2 is performed to reconstruct the second band images Bb1' through Bb3' and to generate the deformed second radiation image Sb'. Note that reconstruction may be performed by performing the process of FIG. 2 in reverse order. That is, an enlarged image Ssb3' is added to the band image Bb3' to generate a reduced image Ssb2, then the reduced image Ssb2 is enlarged to generate an enlarged image Ssb2". Next, the enlarged image Ssb2" is added to the band image Bb1' to generate a reduced image Ssb1, then the reduced image Ssb1 is enlarged to generate an enlarged image Ssb1". Thereafter, the enlarged image Ssb1" is added to the band image Bb1' to generate the deformed second radiation image Sb'. Note that in the case that the second band images Bb1 through Bb3 were obtained by wavelet conversion, the reconstruction is performed by employing inverse wavelet conversion.

The subtraction processing section 60 performs subtraction processes employing the first radiation image Sa and the deformed second radiation image Sb' to obtain a soft tissue image SP, from which bones have been removed, that represents the soft tissue of the subject, and a bone image BP that represents the bones of the subject. Generally, subtracted images Psub are represented by differences among corresponding pixels of the first radiation image Sa (high energy image) which is multiplied by a first weighting coefficient Ka and the second radiation image Sb (low energy image) which is multiplied by a second weighting coefficient Kb, and can be expressed by the following Formula (2). Note that in Formula (2), Kc represents a predetermined offset value.

$$P\text{sub} = Ka \cdot Sa - Kb \cdot Sb' + Kc \qquad (2)$$

The subtraction processing section 60 performs the calculation of Formula (2) to generate the soft tissue image SP as the subtracted image Psub. Thereafter, the subtraction processing section 60 subtracts the soft tissue image SP from the first radiation image Sa to generate the bone image BP (BP=Sa−SP).

Figure 4:
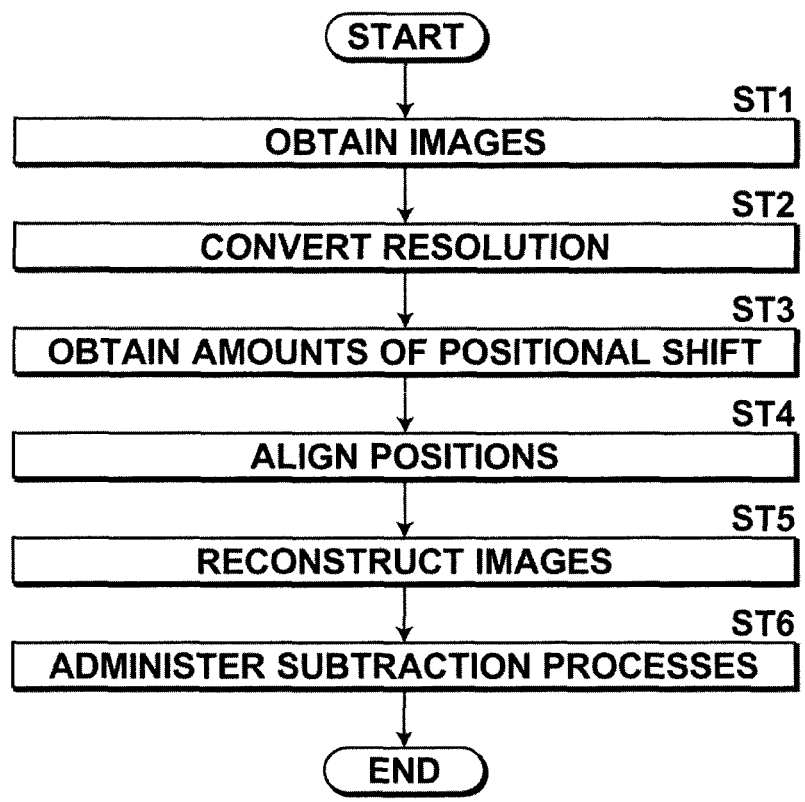
FIG. 4 is a flow chart that illustrates the steps of a process performed by the first embodiment.

Next, the steps of the process performed by the first embodiment will be described. FIG. 4 is a flow chart that illustrates the steps of the process performed by the first embodiment. First, the image obtaining section 10 obtains the first and second radiation images Sa and Sb (OBTAIN IMAGES, step ST1). Then, the resolution converting section 20 converts the resolutions of the first and second radiation images Sa and Sb into a plurality of band images of different frequency bands, to generate band images Ba1 through Ba3 and Bb1 through Bb3 for the first and second radiation images Sa and Sb (step ST2). Thereafter, the positional shift amount obtaining section 30 obtains amounts of positional shift C1 through C3 among the first band images Ba1 through Ba3 and the second band images Bb1 through Bb3 (step ST3). The positional aligning section 40 deforms the second band images Bb1 through Bb3 based on the amounts of positional shift C1 through C3, to perform positional alignment of the second band images Bb1 through Bb3 with respect to the first band images Ba1 through Ba3 (step ST4). The reconstructing section 50 reconstructs the deformed second band images Bb1' through Bb3', to generate the deformed second radiation image Sb' (step ST5).

Then, the subtraction processing section 60 performs subtraction processes employing the first radiation image Sa and the deformed second radiation image Sb' to generate the soft tissue image SP, from which bones have been removed, that represents the soft tissue of the subject and the bone image BP that represents the bones of the subject (step ST6), and the process ends.

In this manner, the first embodiment generates the plurality of first band images and the plurality of second band images that represent structures of different frequency bands for each of the first and second radiation images Sa and Sb. Then, the amounts of positional shifts are obtained for the first and second band images, and the second band images are deformed based on the amounts of positional shift to positionally align the first and second band images. Thereafter, the deformed second band images are reconstructed to generate the deformed second radiation image Sb'. Here, in the case that a plurality of structures of different frequency bands are included in the first and second radiation images and the plurality of structures respectively exhibit different three dimensional movements, the amount of positional shift for each frequency band is the amount of positional shift for the structures in each frequency band. Accordingly, positional alignment is performed for the band images of each frequency band using the amounts of positional shift, thereby positionally aligning the structures of each frequency band. As a result, positional alignment of the structures of each frequency band can be performed with high accuracy. Accordingly, the soft tissue image SP and the bone image BP, which are generated by the energy subtraction process employing the first radiation image Sa and the deformed second radiation image Sb', do not have artifacts and are of high image quality.

Particularly in the case that the radiation images are those of the human thoracic region, the heart is a structure of a comparatively low frequency band, and the pulmonary blood vessels are structures of a comparatively high frequency band. According to the first embodiment, positional alignment is performed among pairs of band images each of a different frequency band. Therefore, the heart and the pulmonary blood vessels are positionally aligned separately. Accordingly, the soft tissue image SP and the bone image BP can be generated without artifacts by employing the deformed second radiation image Sb', even if the heart and the pulmonary blood vessels included in the first and second radiation images Sa and Sb respectively exhibit different movements.

Figure 5:
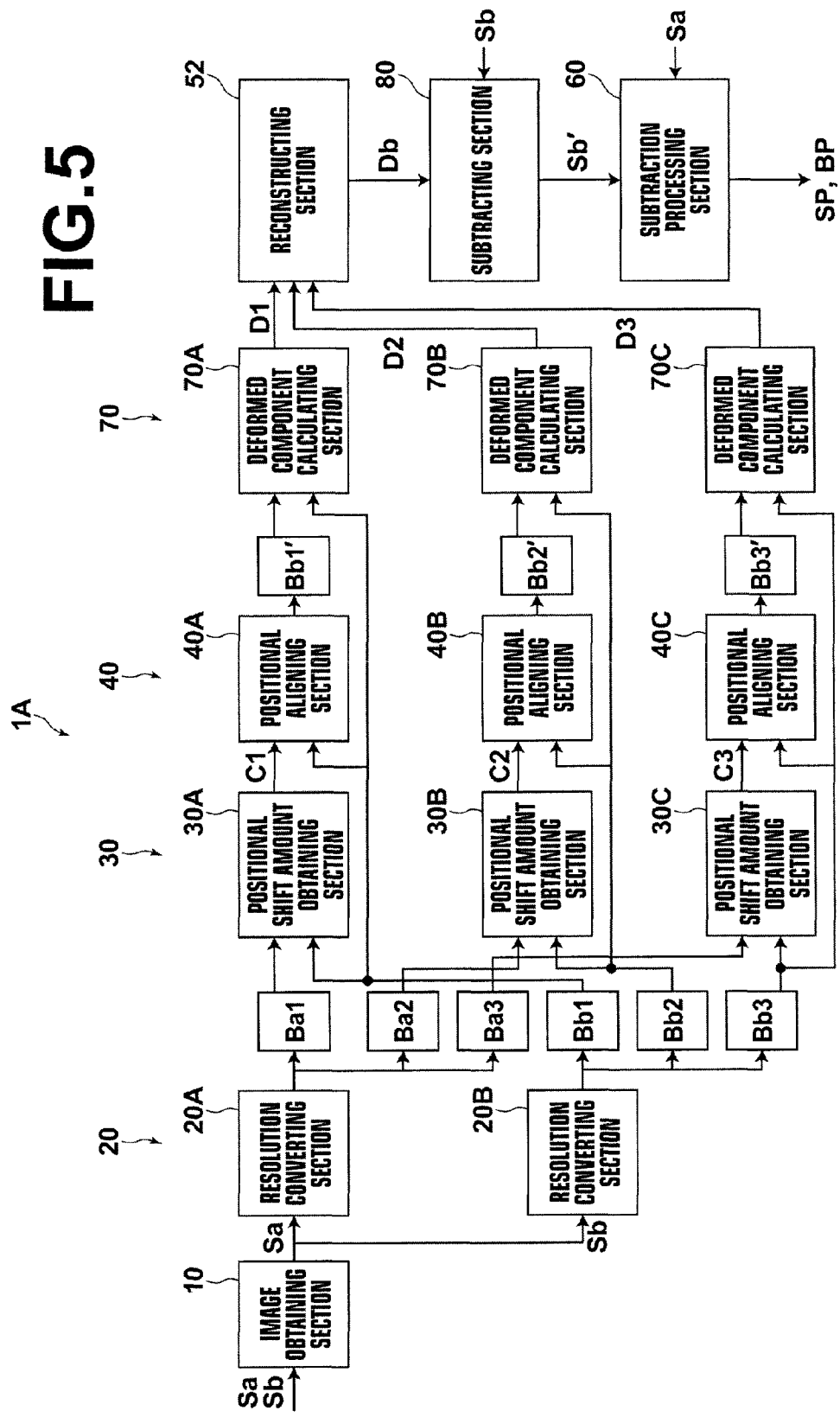
FIG. 5 is a block diagram that illustrates the schematic structure of an image position aligning apparatus according to a second embodiment of the present invention.

Next, a second embodiment of the present invention will be described. FIG. 5 is a block diagram that illustrates the schematic structure of an image position aligning apparatus LA according to the second embodiment of the present invention. Note that elements of the second embodiment which are the same as those of the first embodiment will be denoted by the same reference numerals, and detailed descriptions thereof will be omitted insofar as they are not particularly necessary. The image position aligning apparatus 1A of the second embodiment differs from the image position aligning apparatus 1 of the first embodiment in that it is equipped with: a deformed component calculating section 70 that calculates differences among corresponding pixels within the deformed second band images Bb1' through Bb3' and the second band images Bb1 through Bb3 prior to deformation as deformed component band images D1 through D3; a reconstructing section 52 that reconstructs the deformed component band images D1 through D3 to generate a deformed component image Db; and a subtracting section 80 that subtracts the deformed component image Db from the second radiation image Sb to calculate the deformed second radiation image Sb'.

Note that in FIG. 5, the image position aligning apparatus 1A is equipped with a first deformed component calculating section 70A for calculating the deformed component band image D1, a second deformed component calculating section 70B for calculating the deformed component band image D2, and a third deformed component calculating section 70C for calculating the deformed component band image D3. As an alternative, a single deformed component calculating section 70 may be configured to calculate the deformed component band images D1 through D3. In the following description, the term "deformed component calculating section 70" refers collectively to the first through third deformed component calculating sections 70A through 70C.

Figure 6:
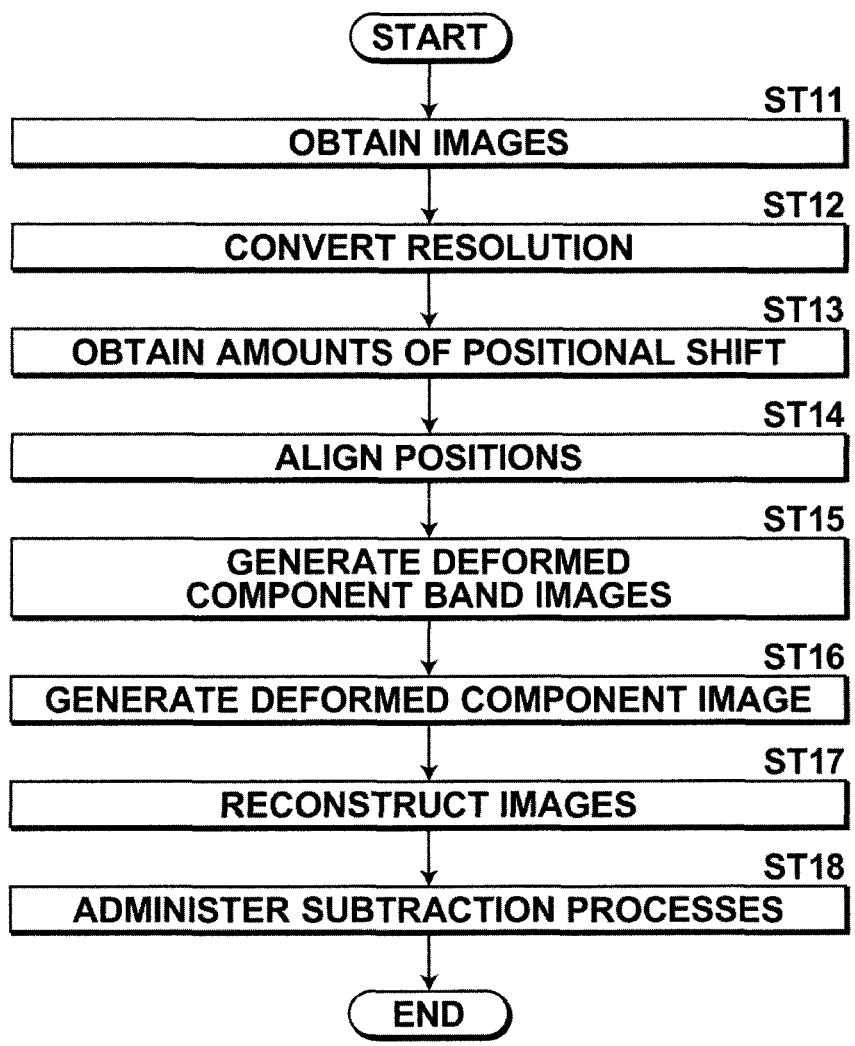
FIG. 6 is a flow chart that illustrates the steps of a process performed by the second embodiment.

Next, the steps of a process performed by the second embodiment will be described. FIG. 6 is a flow chart that illustrates the steps of the process performed by the second embodiment. Note that the processes of step ST11 through step ST14 in the flow chart of FIG. 6 are the same as the processes of step ST1 through step ST4 in the flow chart of FIG. 4. Therefore, detailed descriptions thereof will be omitted.

Following step ST14, the deformed component calculating section 70 calculates the differences among corresponding pixels within the second band images Bb1 through Bb3 and the deformed second band images Bb1' through Bb3', to generate deformed component band images D1 through D3 (step ST15). Then, the reconstructing section 52 reconstructs the deformed component band images D1 through D3 to generate the deformed component image Db (step ST16). The deformed component image Db is an image that represents only the components included in the second radiation image Sb which have been deformed with respect to the first radiation image Sa.

Thereafter, the subtracting section 80 subtracts pixels within the deformed component image Db corresponding to those in the second radiation image Sb from the second radiation image Sb, to remove the components of the second radiation image Sb which have been deformed with respect to the first radiation image Sa from the second radiation image Sb, to generate the deformed second radiation image Sb' (step ST17). Next, the subtraction processing section 60 performs subtraction processes employing the first radiation image Sa and the deformed second radiation image Sb' to generate the soft tissue image SP, from which bones have been removed, that represents the soft tissue of the subject and the bone image BP that represents the bones of the subject (step ST18), and the process ends.

Here, the deformed component image Db generated by the second embodiment represent positional shifts of structures of different frequency bands included in the first and second radiation images Sa and Sb. For this reason, positional alignment of the first and second radiation images Sa and Sb can be performed practically for each pair of the first band images and the second band images of different frequency bands by subtracting the deformed component image Db from the second radiation image Sb, even in the case that a plurality of structures of different frequency bands are included in the first and second radiation images and the plurality of structures respectively exhibit different three dimensional movements. Accordingly, positional alignment of the structures of each frequency band can be performed with high accuracy, even if the frequency bands of the structures included in the first and second radiation images are different. As a result, the soft tissue image SP and the bone image BP, which are generated by the energy subtraction process employing the first radiation image Sa and the deformed second radiation image Sb', do not have artifacts and are of high image quality.

Figure 7:
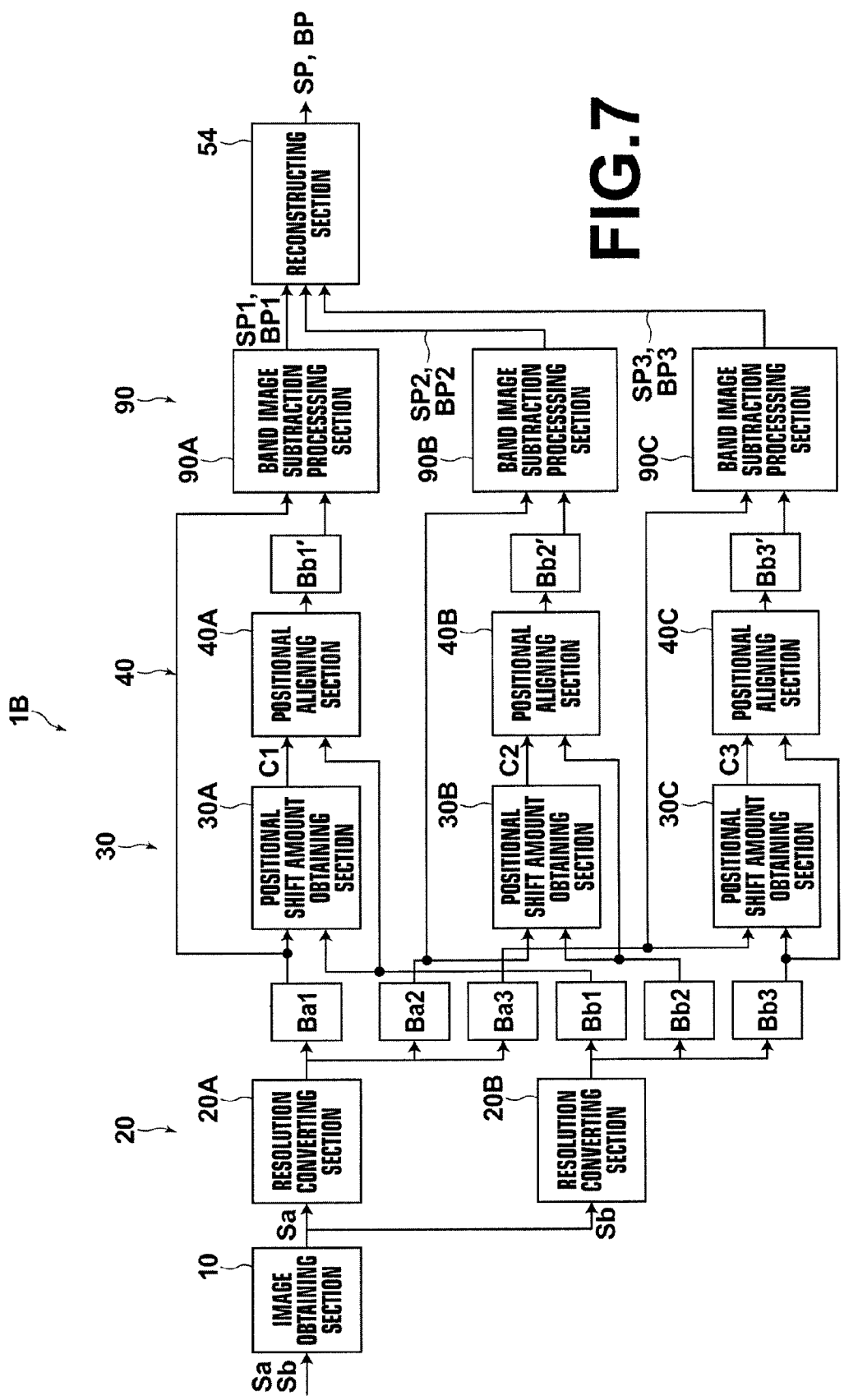
FIG. 7 is a block diagram that illustrates the schematic structure of an image position aligning apparatus according to a third embodiment of the present invention.

Next, a third embodiment of the present invention will be described. FIG. 7 is a block diagram that illustrates the schematic structure of an image position aligning apparatus 1B according to the third embodiment of the present invention. Note that elements of the third embodiment which are the same as those of the first embodiment will be denoted by the same reference numerals, and detailed descriptions thereof will be omitted insofar as they are not particularly necessary. The image position aligning apparatus 1B of the third embodiment differs from the image position aligning apparatus 1 of the first embodiment in that it is equipped with: a band image subtraction processing section 90 that performs subtraction processes employing the first band images Ba1 through Ba3 and the deformed second band images Bb1' through Bb3'; and a reconstructing section 54 that reconstructs the band images of the bones and soft tissue generated by the subtraction processing section 90 to generate the soft tissue image SP and the bone image BP.

Note that in FIG. 7, the image position aligning apparatus 1B is equipped with a first band image subtraction processing section 90A for calculating a soft tissue band image SP1 and a bone band image BP1, a second band image subtraction processing section 90B for calculating a soft tissue band image SP2 and a bone band image BP2, and a third band image subtraction processing section 90C for calculating a soft tissue band image SP3 and a bone band image BP3. As an alternative, a single band image subtraction processing section 90 may be configured to calculate the soft tissue band images SP1 through SP3 and the bone band images BP1 through BP3. In the following description, the term "band image subtraction processing section 90" refers collectively to the first through third band image subtraction processing sections 90A through 90C.

Figure 8:
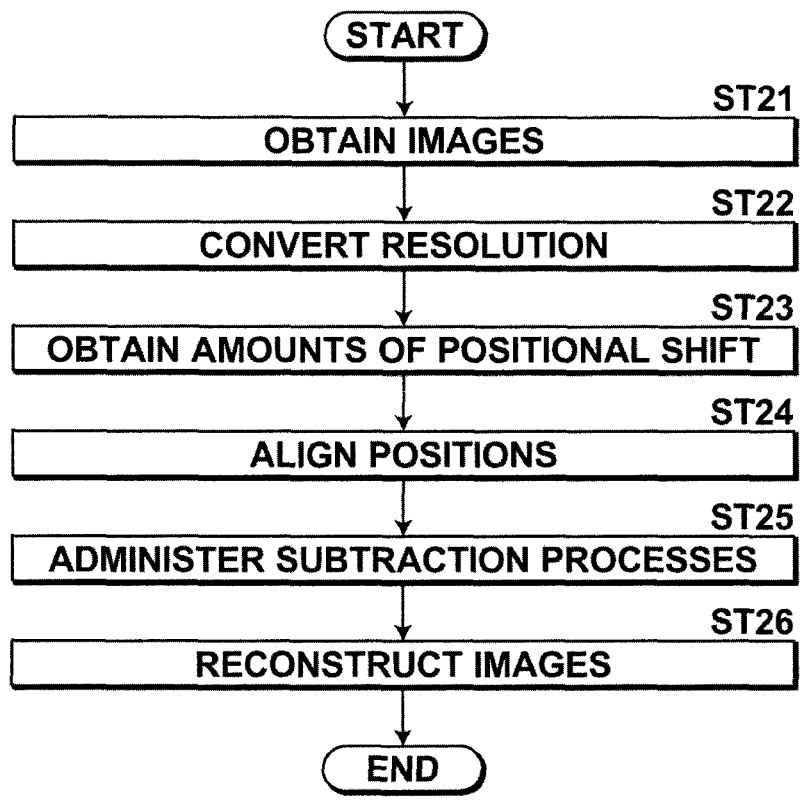
FIG. 8 is a flow chart that illustrates the steps of a process performed by the third embodiment.

Next, the steps of a process performed by the third embodiment will be described. FIG. 8 is a flow chart that illustrates the steps of the process performed by the third embodiment. Note that the processes of step ST21 through step ST24 in the flow chart of FIG. 8 are the same as the processes of step ST1 through step ST4 in the flow chart of FIG. 4. Therefore, detailed descriptions thereof will be omitted.

Following step ST24, the band image subtraction processing section 90 performs subtraction processes using the first band images Ba1 through Ba3 and the deformed second band images Bb1' through Bb3', to generate soft tissue band images SP1 through 593 and bone band images BP1 through BP3 (step ST25). Then, the reconstructing section 54 reconstructs the soft tissue band images SP1 through SP3 and the bone band images BP1 through BP3 to generate the soft tissue image SP and the bone image BP (step ST26), and the process ends.

Here, the soft tissue band images SP1 through SP3 and the bone band images BP1 through BP3, which are obtained by performing the subtraction processes using the first band images Ba1 through Ba3 and the deformed second band images Bb1' through Bb3', represent frequency components of the soft tissue image and the bone image, from which positional shifts among the structures of each frequency band have been removed. For this reason, the soft tissue image SP and the bone image BP can be generated without artifacts, by reconstructing the soft tissue image SP from the soft tissue band images SP1 through SP3 by reconstructing the bone image BP from the bone band images BP1 through BP3 as in the third embodiment.

Figure 9:
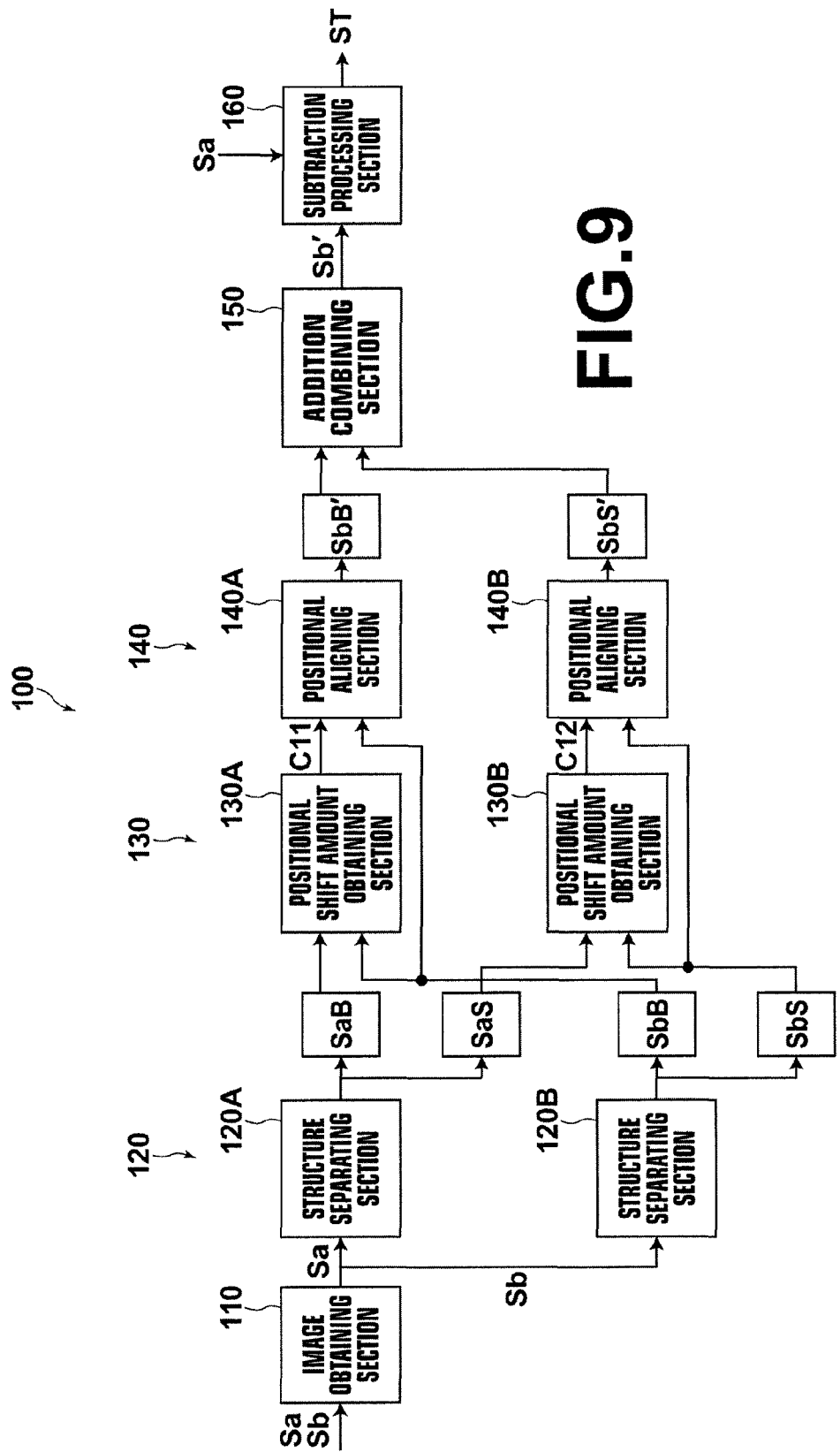
FIG. 9 is a block diagram that illustrates the schematic structure of an image position aligning apparatus according to a fourth embodiment of the present invention.

Next, a fourth embodiment of the present invention will be described. FIG. 9 is a block diagram that illustrates the schematic structure of an image position aligning apparatus 100 according to the fourth embodiment of the present invention. As illustrated in FIG. 9, the image position aligning apparatus 100 of the fourth embodiment is equipped with: an image obtaining section 110; a structure separating section 120; a positional shift amount obtaining section 130; a position aligning section 140; an addition combining section 150; and a subtraction processing section 160. Note that in the fourth embodiment, a temporal subtraction process is performed using first and second radiation images Sa and Sb. Therefore, the two radiation images Sa and Sb are those in temporal series which are obtained at different times.

The image obtaining section 110 performs the same processes as those performed by the image obtaining sections 10 of the first through third embodiments.

The structure separating section 120 separates each of the first and second radiation images Sa and Sb into structure images that represent structures having different anatomical features included therein. Note that in the fourth embodiment, the first and second radiation images Sa and Sb are separated into a bone image that represents bones and a soft tissue image that represents soft tissue. Separation of the radiation images into the bone image and the soft image may be performed by the technique disclosed in Published U.S. Patent Application Publication No. 20050100208, for example. This technique employs a neural network which has performed learning to generate bone images by extracting bones from radiation images that include bones and soft tissue, to generate bone images from radiation images. The structure separating section 120 employs the technique disclosed in U.S. Patent Application Publication No. 20050100208 to generate a first bone image SaB from the first radiation image Sa, subtracts the first bone image SaB from the first radiation image Sa to generate a first soft tissue image SaS. Similarly, a second bone image SbB is generated from the second radiation image Sb, and a second soft tissue image SbS is generated by subtracting the second bone image SbB from the second radiation image Sb.

Note that in FIG. 9, the image position aligning apparatus 100 is equipped with a first structure separating section 120A that separates the structures within the first radiation image Sa, and a second structure separating section 120B that separates the structures within the second radiation image Sb. As an alternative, a single structure separating section 120 may be configured to separate the structures within the first and second radiation images Sa and Sb. In the following description, the term "structure separating section 120" refers collectively to the first and second structure separating sections 120A and 120B.

The positional shift amount obtaining section 130 obtains amounts of positional shift C11 among corresponding positions within the first bone image SaB and the second bone image SbB, as well as amounts of positional shift C12 among corresponding positions within the first soft tissue image SaS and the second soft tissue image SbS. Note that the processes performed by the positional shift amount obtaining section 130 are the same as those performed by the positional shift amount obtaining sections 30 of the first through third embodiments, and therefore a detailed description thereof will be omitted.

Note that in FIG. 9, the image position aligning apparatus 100 is equipped with a first positional shift amount obtaining section 130A that obtains the amounts of positional shift C11 between the first bone image SaB and the second bone image SbB, and a second positional shift amount obtaining section 130B that obtains the amounts of positional shift C12 between the first soft tissue image SaS and the second soft tissue image SbS. As an alternative, a single positional shift amount obtaining means 130 may be configured to obtain the amounts of positional shift between the first bone image SaB and the second bone image SbB, as well as between the first soft tissue image SaS and the second soft tissue image SbS. In the following description, the term "positional shift amount obtaining section 130" refers collectively to the first and second positional shift amount obtaining sections 130A and 130B.

The positional aligning section 140 deforms the second bone image SbB and the second soft tissue image SbS based on the amounts of positional shift C11 and C12 to perform positional alignment between the first bone image SaB and the second bone image SbB, as well as between the first soft tissue image SaS and the second soft tissue image SbS, and generates a deformed second bone image SbB' and a deformed second soft tissue image SbS'. Note that the processes performed by the positional aligning section 140 are the same as those performed by the positional aligning sections 30 of the first through third embodiments, and therefore a detailed description thereof will be omitted.

Note that in FIG. 9, the image position aligning apparatus 100 is equipped with a first positional aligning section 140A that performs positional alignment of the first bone image SaB and the second bone image SbB, and a second positional aligning section 140B that performs positional alignment of the first soft tissue image SaS and the second soft tissue image SbS. As an alternative, a single positional aligning section 140 may be configured to perform positional alignment of the first bone image SaB and the second bone image SbB as well as positional alignment of the first soft tissue image SaS and the second soft tissue image SbS. In the following description, the term "positional aligning section 140" refers collectively to the first and second positional aligning sections 140A and 140B.

The addition combining section 150 adds corresponding pixels of the deformed second bone image SbB' and the deformed second soft tissue image SbS' to generate a deformed second radiation image Sb'.

The subtraction processing section 160 performs a subtraction process using the first radiation image Sa and the deformed second radiation image Sb' to generate a subtracted image. Note that the fourth embodiment differs form the first through third embodiments in that the generated subtracted image is a subtracted image ST that represents simple differences between the first radiation image Sa and the deformed second radiation image Sb'.

Figure 10:
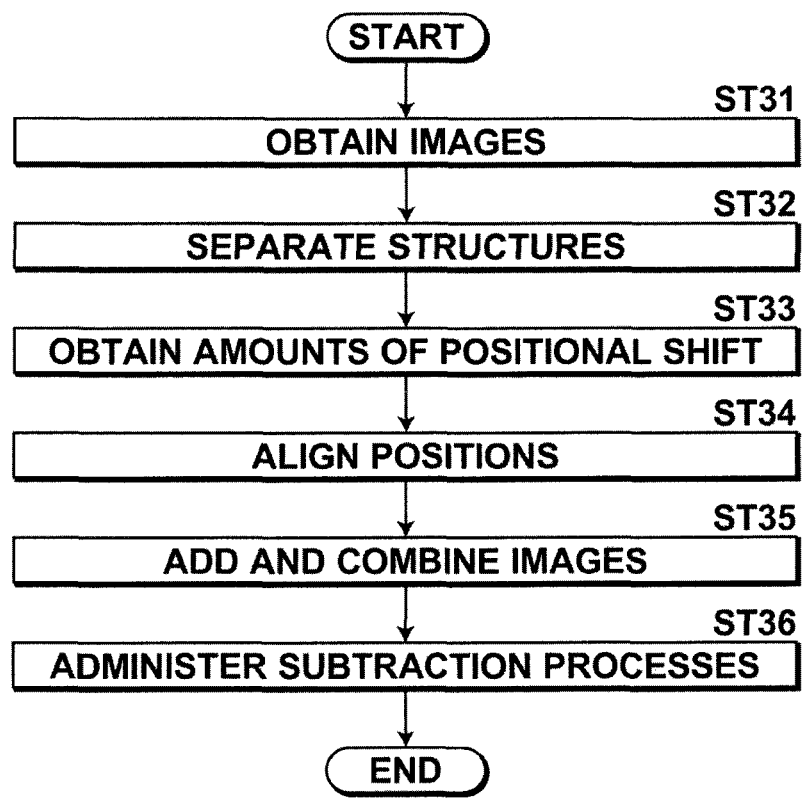
FIG. 10 is a flow chart that illustrates the steps of a process performed by the fourth embodiment.

Next, the steps of the process performed by the fourth embodiment will be described. FIG. 10 is a flow chart that illustrates the steps of the process performed by the fourth embodiment. First, the image obtaining section 110 obtains the first and second radiation images Sa and Sb (OBTAIN IMAGES, step ST31). Then, the structure separating section 120 separates each of the first and second radiation images Sa and Sb into structure images that represent structures having different anatomical features from each other, to generate the first bone image SaB, the first soft tissue image SaS, the second bone image SbB, and the second soft tissue image SbS (step ST32). Next, the positional shift amount obtaining section 130 obtains amounts of positional shift C11 between the first bone image SaB and the second bone image SbB, and amounts of positional shift C12 between the first soft tissue image SaS and the second soft tissue image SbS (step ST33). Thereafter, the positional aligning section 140 deforms the second bone image SbB and the second soft tissue image SbS based on the amounts of positional shift C11 and C12, to perform positional alignment of the second bone image SbB with respect to the first bone image SaB and to perform positional alignment of the second soft tissue image SbS with respect to the first soft tissue image SaS, and generates the deformed second bone image SbB' and the deformed second soft tissue image SbS'. (step ST34).

Further, the addition combining section 150 adds and combines the deformed second bone image SbB' and the deformed second soft tissue image SbS' to generate the deformed second radiation image Sb' (step ST35). Then, the subtraction processing section 160 performs a subtraction process employing the first radiation image Sa and the deformed second radiation image Sb' to generate the subtracted image ST that represents the differences between the first radiation image Sa and the deformed second radiation image Sb' (step ST36), and the process ends.

In this manner, the fourth embodiment separates each of the first and second radiation images Sa and Sb into structure images that represent structures having different anatomical features included therein. Then, positional alignment is performed for each pair of images that represent corresponding structures. Thereafter, the positionally aligned images are reconstructed to generate the deformed second radiation image Sb'. For this reason, each of the structures can be positionally aligned, even if a plurality of structures included in the first and second radiation images Sa and Sb respectively exhibit different three dimensional movements. Accordingly, the subtracted image ST, which is generated by the energy subtraction process employing the first radiation image Sa and the deformed second radiation image Sb', does not have artifacts and is of high image quality.

Note that in the first through fourth embodiments described above, subtraction processes that use the first and second radiation images Sa and Sb are performed to obtain the bone images BP, the soft tissue images SP, or the temporal subtracted image ST. It goes without saying, however, that the present invention may be applied to positional alignment for cases in which first and second radiation images Sa and Sb are added to obtain an image in which noise is reduced.

In addition, in the first through fourth embodiments described above, positional alignment operations are performed between the first and second radiation images Sa and Sb. It is also possible to apply the present invention to perform positional alignment of two images obtained by different modalities. Specifically, modalities other than X ray imaging apparatuses that employ various technologies, such as X ray CT (Computed Tomography) apparatuses, US (Ultra Sound) diagnostic apparatuses, MRI (Magnetic Resonance Imaging) apparatuses, PET (Positron Emission Tomography) apparatuses, and SPET (Single Photon Emission Tomography) apparatuses are utilized in the field of medical images. Therefore, it is possible to perform positional alignment of two images obtained by such modalities. For example, positional alignment can be performed between a CT image obtained by an X ray CT apparatus and an MRI image obtained by an MRI apparatus, or between a CT image and a PET image obtained by a PET apparatus. In addition, there are cases in which imaging agents are employed during imaging using X ray CT apparatuses. The present invention may be applied to positional alignment of a plurality of CT images, in cases that changes that occur due to use of the imaging agents are imaged to obtain the plurality of CT images.

Note that pixel values of the pixels of images are unique values for each modality. Therefore, amounts of positional shift among images obtained by different modalities cannot be accurately calculated if normalized cross correlated values are employed as in the embodiments described above. For this reason, positional alignment of images obtained by different modalities is performed by a technique that calculates amounts of positional shift by employing normalized mutual information as degrees of similarity as disclosed by K. Watanabe, in "Positional Alignment and Overlapping of Multi Modality Images", Journal of the Japanese Society of Radiological Technology, Vol. 59, No. 1, pp. 60-65, 2003, for example.

The normalized mutual information may be calculated by the techniques disclosed in U.S. Pat. No. 7,397,934 and Japanese Unexamined Patent Publication No. 2009-195471, for example. Mutual information is a measure that quantifies the amount of data related to a signal X held by a signal Y. A piece of normalized mutual information NMI (X, Y) can be calculated by Formula (3) below, after calculating an entropy h(X) of a signal X, an entropy h(Y) of a signal Y, and a two dimensional histogram (simultaneous histogram, joint histogram, joint brightness histogram) Hist (X, Y) of the signals X and Y. The entropy h(X) of the signal X is calculated by a probability density function p(x) of the value (pixel value) of the signal X. The entropy h(Y) of the signal Y is calculated in the same manner.

$$NMI(X, Y) = \frac{h(X) + h(Y)}{h(X, Y)} \quad (3)$$

$$\begin{cases} h(X) = -\sum_x p(x)\log_2 p(x) \\ h(Y) = -\sum_y p(y)\log_2 p(y) \\ h(X, Y) = -\sum_x \sum_y p(x, y)\log_2 p(x, y) \end{cases}$$

$$\begin{cases} p(x) = \frac{1}{N}\text{Hist}(x) \\ p(y) = \frac{1}{N}\text{Hist}(y) \\ p(x, y) = \frac{1}{N}\text{Hist}(x, y) \end{cases}$$

wherein h: entropy p: probability density distribution (mutual frequency histogram)

X, Y: original signals xylem: signal values (pixel values)

N: number of samples (number of pixels)

Hist: histogram

In the case that the signals X and Y are completely independent of each other, h(X,Y)=h(X)+h(Y). In the case that the signals X and Y are not independent, h(X, Y)<h(X)+h(Y). The minimum value that h(X, Y) can assume is either h(X) or h(Y). Therefore, the range of possible values for the normalized mutual information NMI (X, Y) is from 1 to 2. In the present invention, NMI (X,Y)−1 is calculated as the ultimate normalized mutual information, such that the range of possible values for the normalized mutual information becomes from 0 to 1. Thereby, in the case that the signals X and Y are completely independent, NMI (X, Y)=0. The value of NMI (X, Y) will increase as the amount of overlapping information increases. When the signals X and Y are completely equal, that is, when corresponding ROI's of a first and second image of different modalities completely match, then NMI (X, Y)=1.

The degree of similarity calculated in the manner described above will assume a value closer to 0 the greater the amounts of positional shift between the first and second images are, and will assume a value closer to 1 the lower the amounts of positional shift are. Accordingly, the positional shift amount obtaining sections 30 and 130 sets ROI's of predetermined sizes at corresponding lattice points in each of the first image and the second image. Then, one of the ROI's (for example, the ROI within the first band image Ba1) is shifted within a predetermined range that employs the corresponding ROI within the second band image Bb1 as a reference, to calculate the degree of similarity between the two ROI's. The amount of shifting between the ROI's when the degree of similarity is maximal, that is, the amount of shifting of the lattice points of the second image using the lattice points of the first image as a reference, is calculated as the amount of positional shifting.

Accurate positional alignment of images obtained by different modalities can be performed by the first through fourth embodiments, by employing the amounts of positional shifting calculated in this manner.

In the first through fourth embodiments, and particularly in the third embodiment, the reconstruction performed by the reconstructing section 54 is performed sequentially from the low frequency band bone band image BP3 and the soft tissue band image SP3 to the high frequency band bone band image BP1 and the soft tissue band image SP1. However, a long amount of time is required for calculations until all of the band images are reconstructed to generate the bone image BP and the soft tissue image SP. As a result, it is necessary for a user to wait a long amount of time until the bone image BP and the soft tissue image SP are displayed in the case that he or she inputs a command to display the bone image BP and the soft tissue image SP.

Figure 11:
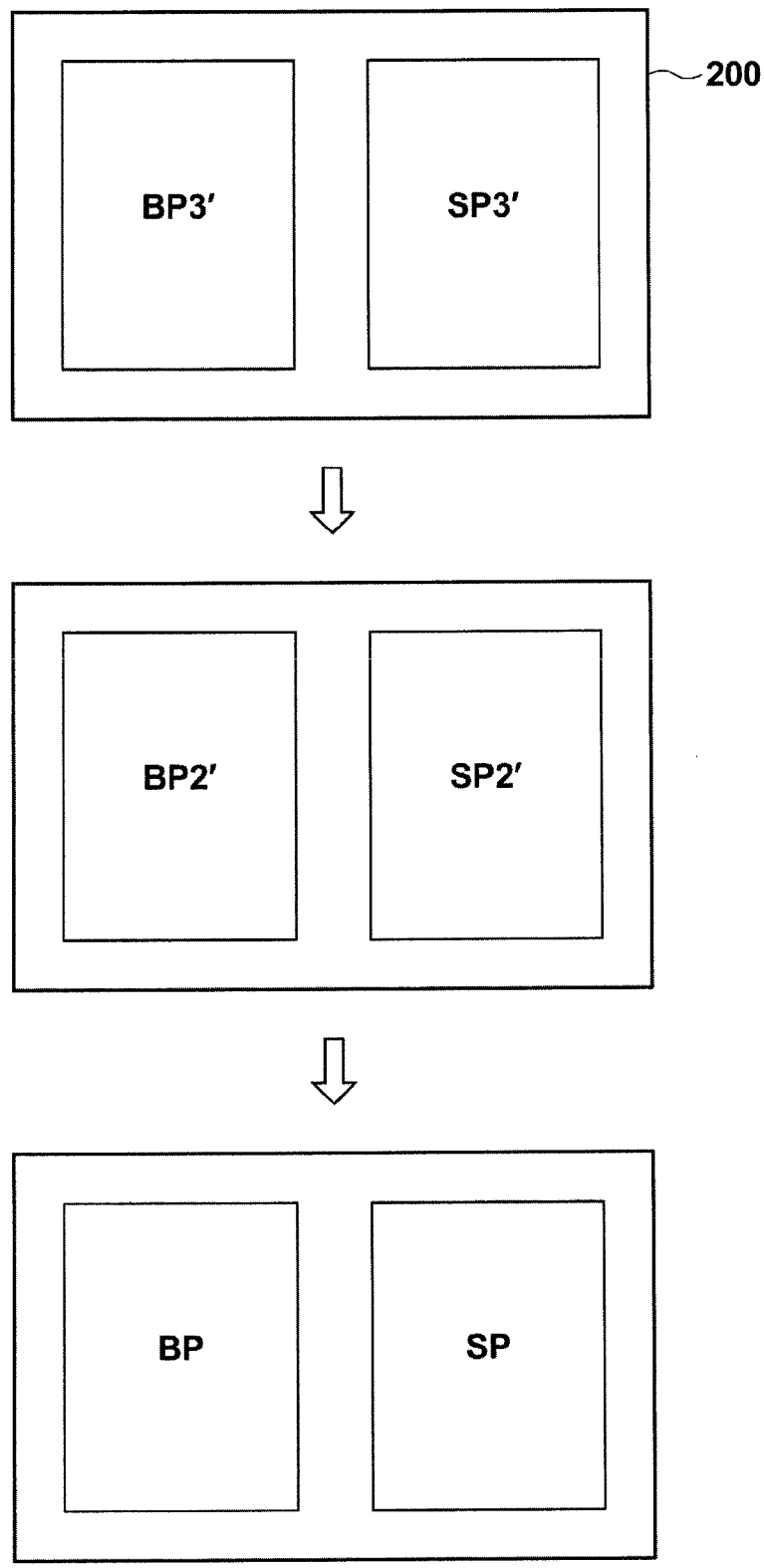
FIG. 11 is a diagram for explaining display of images.

For this reason, and particularly in the third embodiment, a bone image BP3' and a soft tissue image SP3', which have been reconstructed using the lowest frequency bone band image BP3 and the soft tissue image SP3, may be displayed first by a display section 200 such as a liquid crystal display connected to the subtraction processing section 60, as illustrated in FIG. 11. Next, a bone image BP2' and a soft tissue image SP2', which have been reconstructed using the bone band image BP3, the soft tissue image SP3, the bone band image BP2, and the soft tissue image SP2, may be displayed. Finally, the bone image BP and the soft tissue image SP, which have been reconstructed using the bone band images BP1 through BP3 and the soft tissue band images SP1 through SP3 of all frequency bands, may be displayed.

By adopting this configuration, the bone image and the soft tissue image can be displayed, although at low resolution, until the fully reconstructed bone image and the fully reconstructed soft tissue image are displayed. Accordingly, the wait time until images are displayed can be shortened.

Note that images of the different frequency bands which are generated at each step of reconstruction may be sequentially displayed not only in the third embodiment, but also when displaying the deformed second radiation image Sb' in the first embodiment and when displaying the deformed component image Db in the second embodiment.

Figure 12:
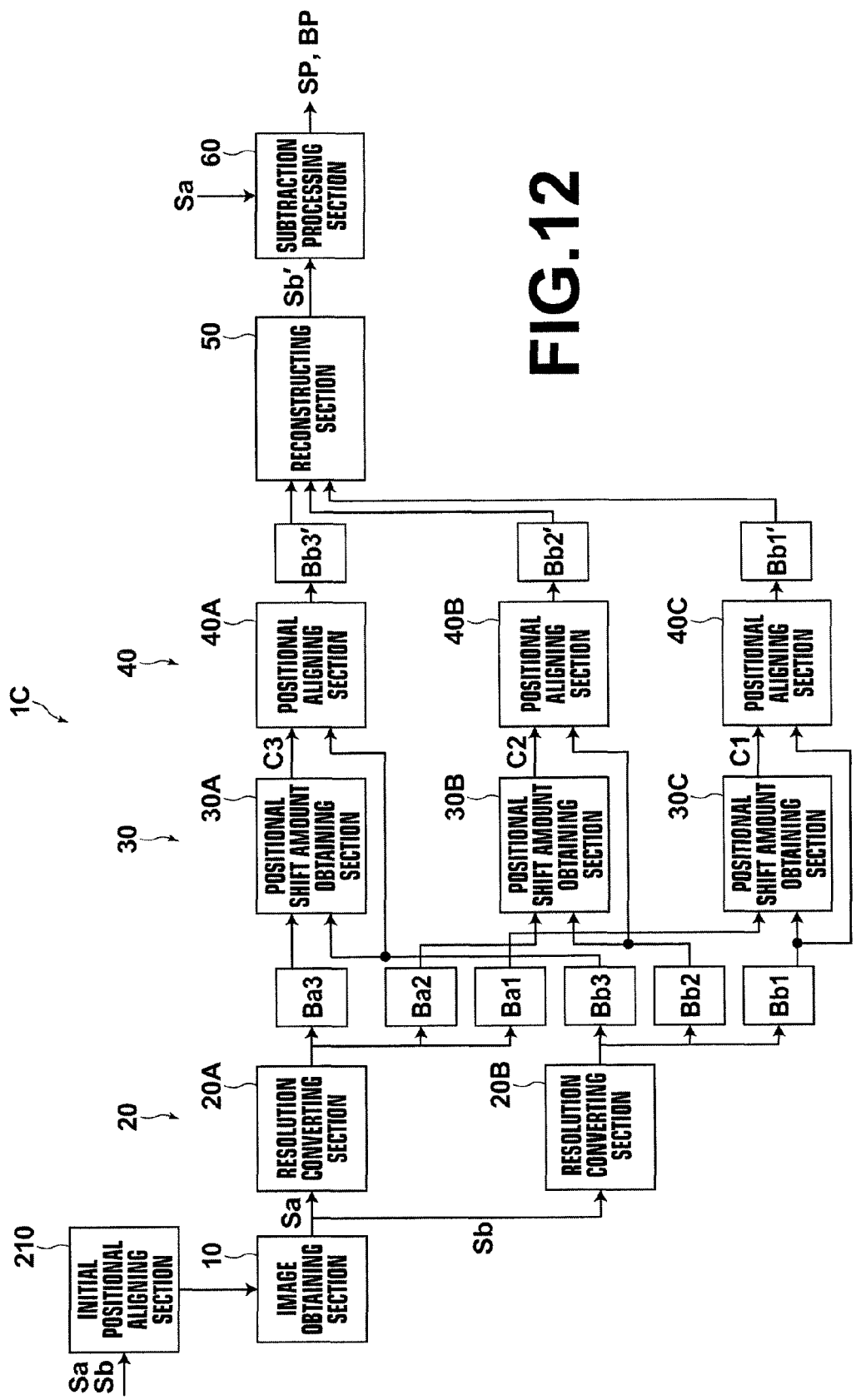
FIG. 12 is a block diagram that illustrates the schematic structure of an image position aligning apparatus according to a fifth embodiment of the present invention.

In addition, a configuration may be adopted in the first through fourth embodiments, wherein rough positional alignment is performed between the first and second radiation images Sa and Sb, and the positional alignment operations of the first through fourth embodiments are performed using the roughly positionally aligned first and second radiation images Sa and Sb. Hereinafter, this configuration will be described as a fifth embodiment. FIG. 12 is a block diagram that illustrates the schematic structure of an image position aligning apparatus 1C according to the fifth embodiment of the present invention. As illustrated in FIG. 12, the image position aligning apparatus 1C of the fifth embodiment differs form the image position aligning apparatus 1 of the first embodiment in that it is equipped with an initial positional aligning section 210.

The initial positional aligning section 210 obtains amounts of positional shift between the first and second radiation images Sa and Sb. Then, the initial positional aligning section 210 deforms the second radiation image Sb using a method that requires a comparatively small amount of calculations, such as affine transform, parallel movement, rotation, magnification, or reduction, to positionally align the first and second radiation images Sa and Sb. The initial positional aligning section 210 differs from the positional aligning section 40 of the first embodiment that performs positional alignment of the band images obtained by resolution conversion. In the fifth embodiment, the deformed second radiation image Sb' is obtained by the resolution converting section 20, the positional shift amount obtaining section 30, the positional aligning section 40, and the reconstructing section 50 using the initially positionally aligned radiation images Sa and Sb.

The positional alignment performed by the positional shift amount obtaining section 30 and the positional aligning section 40 is facilitated by performing initial positional alignment of the first and second radiation images Sa and Sb. Therefore, the positional alignment process can be performed at high speed.

Note that the fifth embodiment is the image position aligning apparatus of the first embodiment provided with the initial positional aligning section 210. The initial positional aligning section 210 may be provided in the image position aligning apparatuses of the second through fourth embodiments as well.

In addition, in the first through third embodiments, reconstruction by the reconstructing sections 50, 52, and 54 may be performed such that pixel values are weighted such that the weighting is greater at pixel positions having small amounts of positional shift. Specifically, the pixel values may be weighted such that weighting is greater at pixel positions having small amounts of positional shift when adding the band images to each other during reconstruction.

Further, in the embodiments described above, the image position aligning apparatuses of the present invention are mounted on imaging consoles. Alternatively, the image position aligning apparatus of the present invention may be applied to an image processing work station which is connected to an imaging system via a network, or to positional alignment processes which are performed on image data transferred to an image storage communications system (PACS: Picture Archiving and Communications System).

What is claimed is:

1. An image position aligning apparatus, comprising:
    band image generating means, for generating a plurality of first band images and a plurality of second band images that represent structures of different frequency bands within a first and a second image of a same portion of a single subject;
    positional shift amount obtaining means, for obtaining amounts of positional shift among corresponding positions within the first band images and the second band images of corresponding frequency bands;
    aligning means, for separately deforming pairs of the first band images and the second band images of corresponding frequency bands based on the amounts of positional shift; and
    reconstructing means, for sequentially reconstructing at least one of the deformed first band images and second band images from low frequency bands, and for obtaining at least one of the first image and the second image in a deformed state.

2. An image position aligning apparatus as defined in claim 1, further comprising:
    display means, for displaying at least one of the deformed first band images and the deformed second band images during the intermediate stages of the reconstruction process in a stepwise manner from the low frequency bands to high frequency bands.

3. An image position aligning apparatus as defined in claim 1, further comprising:
    subtracting means, for obtaining at least one of a plurality of first subtracted band images that mainly include first structures of the subject, and a plurality of second subtracted band images that mainly include second structures of the subject, by performing energy subtraction processes employing at least one of the deformed first band images and the deformed second band images.

4. An image position aligning apparatus as defined in claim 3, further comprising:
    reconstructing means, for sequentially reconstructing at least one of the first subtracted band images and second subtracted band images from low frequency bands, and for obtaining at least one of first subtracted images that mainly include the first structures of the subject and second subtracted images that mainly include the second structures of the subject.

5. An image position aligning apparatus as defined in claim 4, further comprising:
    display means, for displaying at least one of the deformed first subtracted band images and the deformed second subtracted band images during the intermediate stages of the reconstruction process in a stepwise manner from the low frequency bands to high frequency bands.

6. An image position aligning apparatus as defined in claim 1, further comprising:
    initial aligning means, for performing initial positional alignment of the first image and the second image; and wherein:
    the band image generating means generates the plurality of first band images and the plurality of second band images from the initially aligned first and second images.

7. An image position aligning method, comprising:

generating a plurality of first band images and a plurality of second band images that represent structures of different frequency bands within a first and a second image of a same portion of a single subject;

obtaining amounts of positional shift among corresponding positions within the first band images and the second band images of corresponding frequency bands;

deforming separately pairs of the first band images and the second band images of corresponding frequency bands based on the amounts of positional shift; and sequentially reconstructing at least one of the deformed first band images and second band images from low frequency bands, and obtaining at least one of the first image and the second image in a deformed state.

8. A non-transitory computer readable medium having an image position aligning program stored therein, the image position aligning program causing at least one computer to execute the procedures of:

generating a plurality of first band images and a plurality of second band images that represent structures of different frequency bands within a first and a second image of a same portion of a single subject;

obtaining amounts of positional shift among corresponding positions within the first band images and the second band images of corresponding frequency bands;

deforming separately pairs of the first band images and the second band images of corresponding frequency bands based on the amounts of positional shift; and sequentially reconstructing at least one of the deformed first band images and second band images from low frequency bands, and obtaining at least one of the first image and the second image in a deformed state.

9. The apparatus of claim 1, wherein structures in the first band image are not represented in the second band image, and structures in the second band image are not represented in the first band image.

* * * * *